United States Patent
Finke et al.

(10) Patent No.: US 6,823,904 B2
(45) Date of Patent: Nov. 30, 2004

(54) METERING INSTALLATION FOR POWDER PIGMENTS

(76) Inventors: Michael Finke, Dorfatrasse 17, Lage 32791 (DE); Ingo Finke, Sohrenbrade 9, Lage 32791 (DE)

( * ) Notice: Subject to any disclaimer, the term of this patent is extended or adjusted under 35 U.S.C. 154(b) by 0 days.

(21) Appl. No.: 10/390,440

(22) Filed: Mar. 17, 2003

(65) Prior Publication Data

US 2004/0007285 A1 Jan. 15, 2004

(30) Foreign Application Priority Data

Jul. 15, 2002 (DE) .......................................... 102 31 813

(51) Int. Cl.⁷ ................................................ B65B 1/16
(52) U.S. Cl. ............................. 141/61; 141/77; 141/83; 141/317; 222/203; 406/137
(58) Field of Search ............................ 141/72–77, 80, 141/83, 98, 114, 67, 314–317; 406/85, 124, 136, 137, 144; 222/202, 203

(56) References Cited

U.S. PATENT DOCUMENTS

| 4,345,858 A | 8/1982 | Barlow ........................ 406/34 |
| 4,488,837 A | 12/1984 | Mizokawa et al. ........... 406/34 |
| 4,557,632 A | * 12/1985 | Penny .......................... 405/267 |
| 4,775,267 A | 10/1988 | Yamamoto .................... 406/50 |
| 4,934,876 A | * 6/1990 | Dirkse et al. ................ 406/124 |
| 5,921,369 A | * 7/1999 | Steele ....................... 193/25 R |
| 6,287,056 B1 | 9/2001 | Szikszay ..................... 406/197 |

FOREIGN PATENT DOCUMENTS

GB   1 322 968   7/1973

* cited by examiner

Primary Examiner—Gregory L. Huson
Assistant Examiner—Peter deVore
(74) Attorney, Agent, or Firm—Alix, Yale & Ristas, LLP

(57) ABSTRACT

The invention relates to a metering installation for powder pigments, having an arrangement for supplying the powder pigments into a weighing container of a weighing arrangement. The weighing container may be emptied into a pneumatic conveying conduit which leads into a consuming unit, if appropriate, via an intermediate store. The conveying arrangement has a hopper-like pressure container which can be subjected to the action of compressed air. The pressure container has a closure at the base and a laterally curved outlet connector. An injector tube, which can be subjected to the action of compressed air and has lateral exit openings for the compressed air, extends axially into the outlet connector.

37 Claims, 3 Drawing Sheets

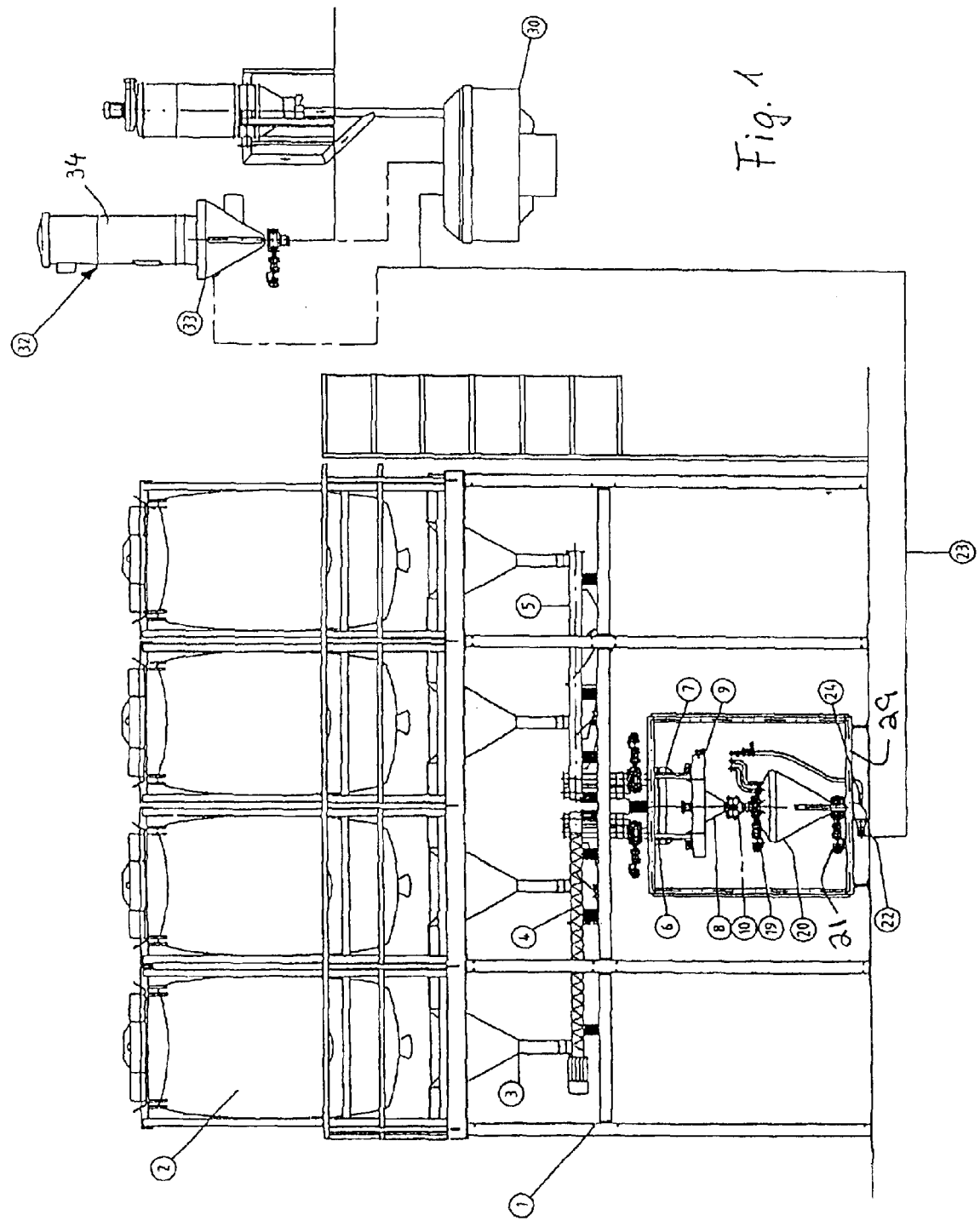

METERING INSTALLATION FOR POWDER PIGMENTS

BACKGROUND OF THE INVENTION

This invention relates to a metering installation for powder pigments. Powder pigments such as those made of iron oxide, titanium dioxide or chromium oxide are used alone, or in mixed form, for dying a wide range of different materials, for example wood, coatings, foodstuff, concrete articles, roofing tiles, composite blocks, etc. They are usually supplied to the end user, from various manufacturers, as bagged goods of approximately 25 kg or in so-called big bags of 1 t. These powder pigments have thus to be mixed with other materials in specified amounts.

The automatic batchwise weighing and conveying of powder pigments is problematic on account of the pronounced bridge formation in containers and conduits. Powder pigments are thus also frequently converted, with the aid of an organic or inorganic binder, into a granular consistency which has good flowing and metering capability. This additional treatment, however, is complex and renders the product considerably more expensive.

SUMMARY OF THE INVENTION

It is an object of the invention is to provide a metering installation which makes it possible to use powder pigments as such, i.e. without further treatment.

Thus, the invention concerns a metering installation for powder pigments, having an arrangement for supplying the powder pigments into a weighing container of a weighing arrangement, it being possible for the weighing container to be emptied into a conveying arrangement which comprises a pneumatic conveying conduit which leads into a consuming unit, if appropriate via an intermediate store, wherein the conveying arrangement has a hopper-like pressure container which can be subjected to the action of compressed air and is provided with a closure at the base and with a laterally curved outlet connector, an injector tube, which can be subjected to the action of compressed air and has lateral exit openings for the compressed air, extending axially in the outlet connector.

Since use is made of a metering installation with a conveying arrangement which has a hopper-like pressure container which can be subjected to the action of compressed air and is provided with a closure at the base and with a laterally curved outlet connector, an injector tube, which can be subjected to the action of compressed air and has lateral exit openings for the compressed air, extending axially into the outlet connector, it is also possible for powder pigment weighed by a weighing arrangement to be conveyed upwards over a relatively large distance.

Further, the invention concerns a hopper-like, closeable container for accommodating powder pigments, having an outer wall and a base provided with an outlet, a flexible inner lining adjacent to said outer wall, an interspace between said outer wall and said lining, and means for subjecting said interspace to the action of compressed air in a pulsating manner.

Additionally, the invention concerns a pneumatic conveying arrangement for powder pigments, having a conveying conduit connected to means for subjecting said conduit to the action of compressed air, wherein a hopper-like pressure container being subjectable to the action of compressed air and provided with a closure at its base and with a laterally curved outlet connector is arranged upstream of the conveying conduit, an injector tube, which can be subjected to the action of compressed air and has lateral exit openings for the compressed air, extending axially into the outlet connector It is expedient here if the weighing arrangement has a weighing container with a flexible inner lining, it being possible for the interspace between the outer wall of the container and the inner lining to be subjected to the action of compressed air in a pulsating manner. Further embodiments, objects and advantages of the invention can be gathered from the following description and the claims.

BRIEF DESCRIPTION OF THE DRAWINGS

The present invention may be better understood and its numerous objects and advantages will become apparent to those skilled in the art by reference to the accompanying drawings in which:

FIG. 1 shows, schematically, a front view of a metering installation for powder pigments.

DETAILED DESCRIPTION OF THE PREFERRED EMBODIMENT

Figure 3:
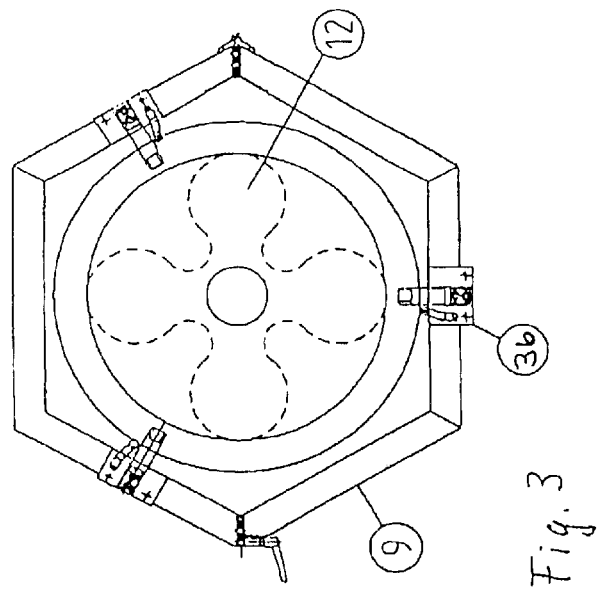
FIG. 3 shows, schematically in section, a detail of the weighing arrangement of FIG. 2.
Figure 2:
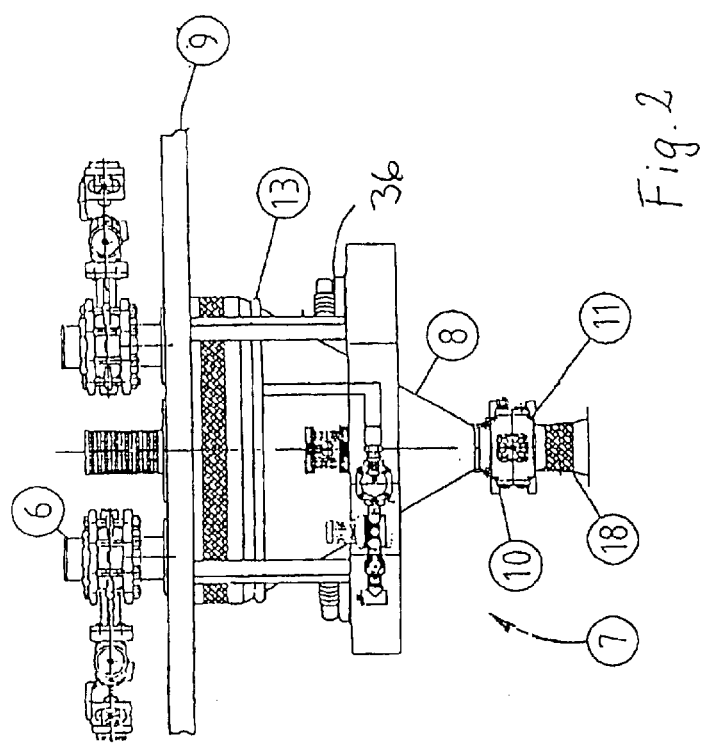
FIG. 2 shows, schematically, a side view of a weighing arrangement for the metering installation of FIG. 1.

The metering installation illustrated in FIG. 1 comprises a platform structure 1 in which a plurality of powder-pigment-containing big bags 2 can be fitted at the top. Instead of the big bags 2, or in addition thereto, it is also possible to provide exchangeable containers into which bagged powder pigment is emptied. The big bags 2 or exchangeable containers are positioned on the platform structure 1 by means of a crane or fork-lift truck. For example, four big bags 2 and/or exchangeable containers are provided for the four primary colors, it being possible for a wide range of different shades to be produced by corresponding mixing.

Run-in hoppers 3 are provided beneath the big bags 2 or exchangeable containers, it being possible for the exchangeable containers to be emptied into the associated run-in hopper 3 directly via an attached emptying flap and a connector, while the big bags 2 can be emptied via vibratory discharge bases (not illustrated) and the associated run-in hopper 3.

From the respective run-in hoppers 3, the powder pigment passes to an associated conveying arrangement, for example in the form of a conveying worm 4 or of a vibration conveyor 5, these serving for conveying powder pigments, via a thin, flexible tube 6 which is arranged at the end of said worm or conveyor, is made, for example, of fabric and serves as a dust filter, into a weighing arrangement 7.

Figure 4:
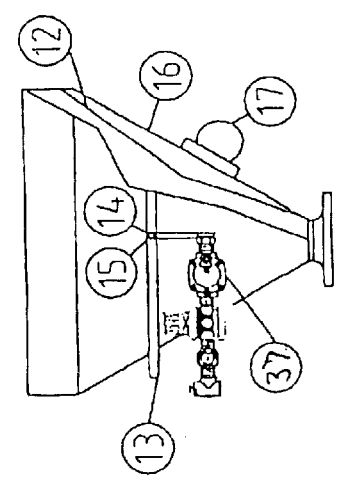
FIG. 4 shows, in schematic and partially cut-away form, a detail of the weighing arrangement of FIG. 2.

The weighing arrangement 7 comprises a weighing container 8 which can be closed by a closure flap, is designed, in the exemplary embodiment illustrated, in a hopper-like manner and is suspended in a frame 9 so as to have its weight gauged via pressure cells 36. The weighing container 8 has a base-side outlet 10 which can be emptied via a closure 11, for example an emptying flap. Furthermore, the weighing container 8 is provided on the inside with a flexible inner lining 12, preferably made of elastomeric material, which is attached by adhesive bonding or vulcanization to the top and bottom ends of the inner wall of the weighing container 8, while an annular conduit 13 for supplying compressed air is provided on the outside of the weighing container 8. From the annular conduit 13, a plurality of conduits 14 lead to air-inlet nozzles 15 in the wall of the weighing container 8, it being possible for air to be introduced, via said nozzles, into the interspace 16 between the inner wall of the weighing container 8 and the inner lining 12, with the result that the inner lining 12 can curve inwards under the action of compressed air, for example as is shown in FIGS. 3 and 4.

The compressed-air supply means for the annular conduit 13 is provided with a control means 37 which makes it possible to produce surges of air of different lengths and at different timings, and if appropriate at different pressures, in the interspace 16, as a result of which the inner lining 12 is curved inwards in correspondingly different ways and to different extents. In this respect, for example, a cycle with the length of a total of approximately 20 seconds, comprising three surges of air with lengths of 5 seconds, 3 seconds and 8 seconds with corresponding pauses, and rapid venting, has proven successful.

The weighing container 8, furthermore, is provided with an exit opening (not illustrated), which is also ventilated in respect of positive pressure, in order for the air introduced into the interspace 16 by way of the surges of air to be let out.

The weighing container 8 may additionally be provided with a vibrator 17, attached to its outer wall, in order to assist the collection of powder pigment in the bottom part of the weighing container 8 and the emptying of the same.

Once it has reached a predetermined weight by accommodating a corresponding quantity of powder pigments, the weighing container 8 is subjected to the action of compressed air via the air-inlet nozzles 15, in a correspondingly cyclic manner, for emptying purposes, as a result of which the inner lining 12 is moved inwards a number of times in undulating fashion. Moreover, it is expedient for the interior of the weighing container 8 to be subjected to the action of a surge of compressed air from beneath when its base-side outlet 10 is opened, in order thus for bridges formed by the powder pigment, in addition, to be broken up. For this purpose, it is possible to utilize a lance, but it is also possible for a pressure container 20, arranged beneath the weighing container 8 and provided with a closure flap 19, to be subjected to the action of air pressure and to be opened in the direction of the weighing container 8 at the beginning of the emptying operation. The weighing container 8 can be completely emptied by the pulsating movement of the inner lining, if appropriate assisted by the vibrator 17. It is also possible, if appropriate, to provide air nozzles to assist complete emptying.

Figure 5:
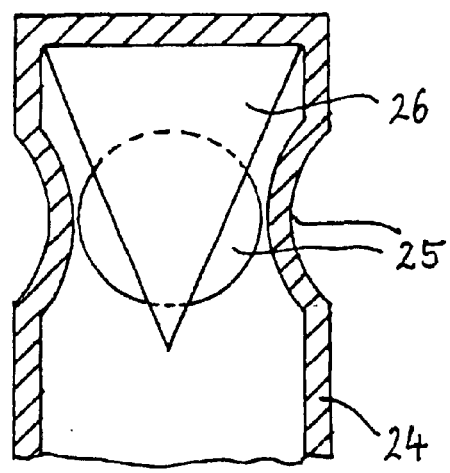
FIG. 5 shows, schematically in section, a detail of an injector tube for a conveying conduit of the metering installation of FIG. 1.

The weighing container 8 is connected, via a thin flexible tube 18 made of a fabric, to a hopper-like pressure container 20 which is arranged beneath the weighing container 8 and has a closure flap 19. Said pressure container is adjoined by an outlet connector 22 which can be closed by a closure 21, for example an emptying flap or a slide, is curved laterally and is connected to a pneumatic conveying conduit 23, for example a conveying tube. Extending axially into the outlet connector 22, in the direction of the conveying conduit 23, is an injector tube 24 which can be subjected to the action of compressed air and, in the outlet connector 22, has a closed end with lateral exit openings 25 arranged adjacent thereto, FIG. 5. A cone 26 for directing the departing compressed air to the exit openings 25 is expediently located adjacent to the exit openings 25.

Figure 6:
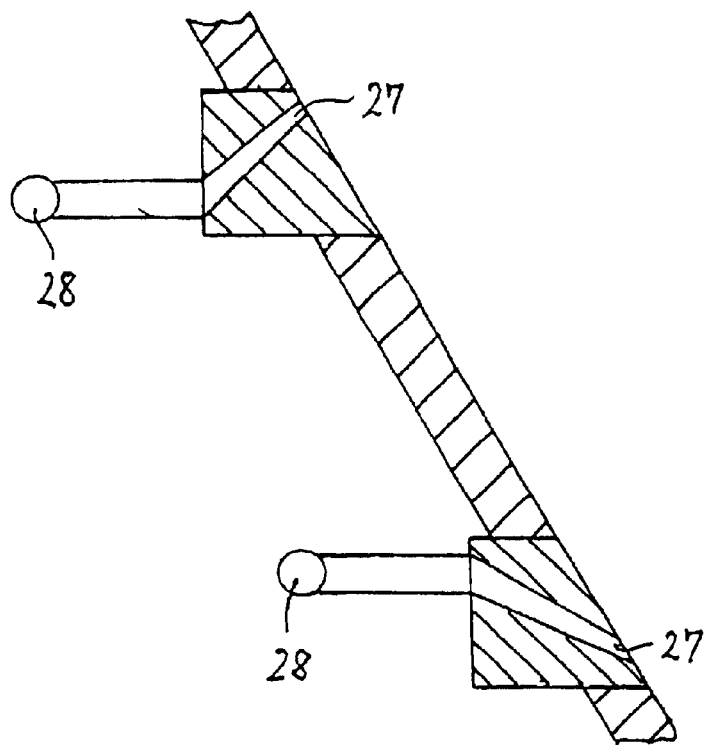
FIG. 6 shows, schematically in section, a detail of a pressure container of the metering installation of FIG. 1.

The pressure container 20 is provided with a multiplicity of air-blow-in nozzles 27 which, in the exemplary embodiment illustrated, are provided in two rows arranged one above the other, each row being supplied via a corresponding annular conduit 28, FIG. 6. In this case, the air-blow-in nozzles 27 of the bottom row are directed downwards and those of the top row are directed upwards. This means that, on the one hand, it is possible to form a corresponding air pressure in the pressure container 20 and, on the other hand, it is thus possible to blow the inner walls of the pressure container 20 free of residues of powder pigment and to loosen the pigment. For the purpose of conveying the powder pigments pneumatically, only a relatively low pressure of approximately 0.5 to 1 bar is generally built up over said pigments in the pressure container 20. The injector tube 24 sucks the powder pigment out of the pressure container and transports it through the conveying conduit 23 by way of the air jets emitted therefrom.

In addition, like the weighing container 8, the pressure container 20 may be arranged in a framework 29 and gauged in respect of its weight via pressure cells, in order for it to be possible to check whether it has been completely emptied.

The conveying conduit 23 may lead directly to a consuming unit 30, which may, if appropriate, also be elevated, for example a mixer for concrete or the like. If appropriate, the conveying conduit 23 may also lead to a possibly elevated, silo-like intermediate store 32, from which the powder pigment can then be supplied to the consuming unit 30.

The intermediate store 32 is expediently designed in a manner corresponding to the weighing container 8 and, in this case, has a hopper-like, closeable storage container 33 with a base-side outlet which has a flexible inner lining on the inside of the outer wall, it being possible for the interspace between the outer wall and the inner lining to be subjected to the action of compressed air in a pulsating manner. Since this corresponds to the configuration of the weighing container 8, it is not depicted. A cartridge filter 34 is positioned on the storage container 33 in order to filter out the conveying air.

The conveying arrangement with the pressure container 20, the outlet connector 22 and the injector tube 24 may also be used with a weighing arrangement 7 other than that which has been illustrated and described. It is likewise possible for the containers 8, 33 to be used in conjunction with different conveying arrangements.

The parts which come into contact with powder pigment, in particular the inner walls or inner linings of the containers 8, 20, 33 and the corresponding surfaces of the closures thereof, but also the conveying arrangements 4, 5 and the conveying conduit 23, are expediently provided with a coating made of a two-component epoxy resin, these coatings largely avoiding the adherence of powder-pigment particles.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A metering installation for supplying powder pigments from a dispensing device to a consuming unit, the metering installation comprising:
   a dispensing device for dispensing the powder pigments;
   a weighing device for weighing the dispensed powder pigments;
   a conical hopper-shaped pressure container having a base and a closure disposed at the base and being adapted to be pressurized by compressed air;
   an arcuate-shaped outlet connector extending laterally from the base of the pressure container for connecting the pressure container with the consuming unit by a pneumatic conveying conduit; and
   an injector tube extending axially within the outlet connector and having lateral exit openings, the injector tube being adapted for injecting compressed air into the outlet connector through the exit openings.

2. The metering installation of claim 1, wherein the pressure container is provided with air-blow-in nozzles.

3. The metering installation of claim 2, wherein the air-blow-in nozzles are arranged in at least one circumferential row and are directed upwards and downwards.

4. The metering installation of claim 1, wherein the weighing device also includes a framework and at least on pressure cell, the pressure container being supported in the framework and the weight of the pressure container being monitored by the pressure cell.

5. The metering installation of claim 1, further comprising an intermediate store disposed intermediate the weighing device and the consuming unit, the intermediate store including a conical hopper-shaped storage container defining an outer wall and a flexible inner lining disposed on the inside of the outer wall, the inner lining and outer wall defining an interspace adapted for receiving pulses of compressed air.

6. The metering installation of claim 5, wherein the inner lining is composed of an elastomeric material.

7. The metering installation of claim 5, wherein the pulses of compressed air have a magnitude and frequency, the interspace being adapted for receiving pulses of compressed air having different magnitudes and different frequencies.

8. The metering installation of claim 5, the intermediate store further includes a plurality of air-inlet nozzles circumferentially distributed within the outer wall of the storage container.

9. The metering installation of claim 5, wherein, the base outlet may be opened and closed, the storage container being adapted for receiving a surge of air through the base outlet when the outlet is opened.

10. The metering installation of claim 5, wherein the intermediate store also includes a framework and at least on pressure cell, the storage container being supported in the framework and the weight of the storage container being monitored by the pressure cell.

11. The metering installation of claim 1, wherein the dispensing device is a conveyor comprising a vibration conveyors or a conveying screws.

12. The metering installation of claim 1, wherein the pressure container includes at least one weight sensor.

13. The metering installation of claim 1, wherein the weighing device includes a weighing container.

14. The metering installation of claim 13, wherein the weighing container has a conical hopper-shape and includes a base outlet disposed above the pressure container.

15. The metering installation of claim 14, wherein the weighing container defines an outer wall and also includes a flexible inner lining disposed on the inside of the outer wall, the inner lining and outer wall defining an interspace adapted for receiving pulses of compressed air.

16. The metering installation of claim 15, wherein the inner lining is composed of an elastomeric material.

17. The metering installation of claim 15, wherein the pulses of compressed air have a magnitude and frequency, the interspace being adapted for receiving pulses of compressed air having different magnitudes and different frequencies.

18. The metering installation of claim 15, wherein the weighing container further includes a plurality of air-inlet nozzles circumferentially distributed within the outer wall of the weighing container.

19. The metering installation of claim 15, wherein the base outlet may be opened and closed, the weighing container being adapted for receiving a surge of air through the base outlet when the outlet is opened.

20. The metering installation of claim 15, wherein at least one of the pressure container, the outlet connector, the inner lining of the weighing container, the inner lining of the storage container and the dispensing device is coated with a coating composed of two-component epoxy resin.

21. The metering installation of claim 14, wherein the weighing device also includes a frame and at least one pressure cell, the weighing container being supported in the frame and the weight of the weighing container being monitored by the pressure cell.

22. The metering installation of claim 14, wherein the weighing container further includes a vibrator.

23. A conical hopper-shaped, closeable container for powder pigments comprises:
   an outer wall;
   a base having an outlet;
   a flexible inner lining disposed adjacent to said outer wall, the inner lining and outer wall defining an interspace therebetween;
   means for injecting pulses of compressed air into said interspace, the pulses of compressed air have a magnitude and frequency;
   a framework; and
   at least one pressure cell;
   wherein the outer wall is supported in the framework and the weight of the storage container is monitored by the pressure cell.

24. The container of claim 23, wherein the inner lining is composed of an elastomeric material.

25. The container of claim 23, wherein the interspace is adapted for receiving pulses of compressed air having different magnitudes and different frequencies.

26. The container of claim 23, further comprising a plurality of air-inlet nozzles circumferentially distributed within the outer wall.

27. The container of claim 23, wherein the base outlet may be opened and closed, the container being adapted for receiving a surge of air through the base outlet when the outlet is opened.

28. The container of claim 23, wherein at least one of the outer wall, the base outlet, and the inner lining comes into contact with the powder pigments, each part of the container coming into contact with the powder pigments being coated with a coating composed of two-component epoxy resin.

29. A pneumatic conveying arrangement for powder pigments comprising:
   a conical hopper-shaped pressure container having a base and a closure disposed at the base;

an arcuate-shaped outlet connector extending laterally from the base of the pressure container;

an injector tube extending axially within the outlet connector and having lateral exit openings, the injector tube being adapted for injecting compressed air into the pressure container through the exit openings;

a conveying conduit adapted for receiving the powder pigments from the outlet connector; and means for supplying compressed air to said pressure container, said injector tube, and said conveying conduit.

30. The conveying arrangement of claim 29, wherein the pressure container includes a plurality of air-blow-in nozzles.

31. The conveying arrangement of claim 30, wherein the air-blow-in nozzles are circumferentially distributed within the pressure container and are directed upwards and downwards.

32. The conveying arrangement of claim 29, further comprising a framework and at least on pressure cell, the pressure container being supported in the framework and the weight of the pressure container being monitored by the pressure cell.

33. The conveying arrangement of claim 29, wherein at least one of the pressure container, the outlet connector, the injector tube and the conveying conduit comes into contact with the powder pigments, each component coming into contact with the powder pigments being coated with a coating composed of two-component epoxy resin.

34. A method for conveying powder pigments in a metering installation for powder pigments; said installation comprising a first container for receiving a predetermined weight of powder pigments, said container comprising closeable upper and lower ends, and being connected with a conveying device including an arcuate-shaped, laterally directed outlet connector and an injector tube extending axially within the outlet connector and having lateral exit openings, the method comprising the steps of:

closing the container at the lower end;

filling the container with a predetermined amount of powder pigments;

closing the container at the upper end;

opening the container at the lower end;

subjecting the powder pigments to a surge of compressed air from the container lower end; and conveying the powder pigments by injecting pressurized air into the outlet connector through the exit openings.

35. The method of claim 34 wherein the step of subjecting the powder pigments to a surge of compressed air includes loosening the powder pigment with the surge of compressed air, and blowing the interior of the container free of the powder pigment.

36. The method of claim 34 wherein the container has an outer wall and a flexible inner lining defining an interspace therebetween and the step of subjecting the powder pigments to a surge of compressed air includes injecting pulses of pressurized air into the interspace whereby the flexible inner lining of the weighing container is moved in a pulsating manner.

37. The method of claim 34 wherein the metering installation also comprises a second container for weighing the dispensed powder pigments disposed above the first container, the second container comprising closeable upper and lower ends, and wherein the method further comprises the step of introducing the surge of compressed air into the second container from the first container.

* * * * *